US012646436B2

(12) United States Patent
Yuan et al.

(10) Patent No.: US 12,646,436 B2
(45) Date of Patent: Jun. 2, 2026

(54) DRIVING INTEGRATED CIRCUIT FOR DRIVING DISPLAY PANEL TO REDUCE HORIZONTAL STRIPE PHENOMENON

(71) Applicant: Novatek Microelectronics Corp., Hsinchu (TW)

(72) Inventors: Kai-Ting Yuan, Hsinchu County (TW); Wei-Lun Shih, Hsinchu City (TW); Yung-Yu Hsieh, Yunlin County (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 18/650,136

(22) Filed: Apr. 30, 2024

(65) Prior Publication Data

US 2025/0336331 A1 Oct. 30, 2025

(51) Int. Cl.
*G09G 3/3266* (2016.01)
*G09G 3/20* (2006.01)

(52) U.S. Cl.
CPC ......... *G09G 3/2092* (2013.01); *G09G 3/3266* (2013.01); *G09G 3/20* (2013.01); *G09G 2310/0286* (2013.01); *G09G 2310/0291* (2013.01); *G09G 2310/08* (2013.01)

(58) Field of Classification Search
CPC ............... G09G 3/2092; G09G 3/3266; G09G 2310/0286; G09G 2310/0291; G09G 2310/08; G09G 3/20
See application file for complete search history.

(56) References Cited

U.S. PATENT DOCUMENTS

| | | | | |
|---|---|---|---|---|
| 2013/0009938 | A1 | 1/2013 | Hwang et al. | |
| 2017/0011679 | A1 | 1/2017 | Lee et al. | |
| 2018/0158409 | A1* | 6/2018 | Byun | G09G 3/3233 |
| 2019/0204642 | A1 | 7/2019 | Song et al. | |
| 2022/0206664 | A1* | 6/2022 | Jung | G09G 3/3266 |

FOREIGN PATENT DOCUMENTS

| | | | |
|---|---|---|---|
| CN | 106128384 | 11/2016 | |
| KR | 1020180122507 A * | 11/2018 | G09G 3/3677 |

OTHER PUBLICATIONS

"Office Action of Taiwan Counterpart Application", issued on Apr. 7, 2025, p. 1-p. 5.

* cited by examiner

*Primary Examiner* — Adam J Snyder
(74) *Attorney, Agent, or Firm* — JCIPRNET

(57) ABSTRACT

A driving integrated circuit includes a first output buffer and a second output buffer. The first output buffer generates a first start pulse signal to a first scan driving circuit, so that the first scan driving circuit generates a first plurality of scan driving signals to a plurality of first scan lines of a display panel. The second output buffer generates a second start pulse signal to a second scan driving circuit, so that the second scan driving circuit generates a second plurality of scan driving signals to a plurality of second scan lines of the display panel. The earliest second scan line of the second scan lines is driven after the first scan lines are driven. A plurality of driving units of the second output buffer are respectively controlled to generate the second start pulse signal having a driving ability less than a driving ability of the first start pulse signal.

8 Claims, 13 Drawing Sheets

DRIVING INTEGRATED CIRCUIT FOR DRIVING DISPLAY PANEL TO REDUCE HORIZONTAL STRIPE PHENOMENON

BACKGROUND

Technical Field

The disclosure relates to a display device, and particularly relates to a driving integrated circuit for a display panel.

Description of Related Art

FIG. 1 is a schematic output waveform diagram of a conventional gate on array (GOA) driving circuit. A display panel 100 shown in FIG. 1 includes scan driving circuits 111 and 112, also called GOA (gate on array) driving circuits. Any one of the scan driving circuits includes a plurality of shift registers connected in series, and the shift registers are coupled to different scan lines of the display panel 100. For example, the output terminals of the shift registers of the scan driving circuit 111 are coupled to different scan lines in a display area 121 of the display panel 100, and the output terminals of the shift registers of the scan driving circuit 112 are coupled to different scan lines in a display area 122 of the display panel 100. The scan driving circuit 111 sequentially generates a plurality of scan driving signals based on a start pulse signal STV11, and the scan driving signals are output to the different scan lines in the display area 121. Similarly, the scan driving circuit 112 sequentially generates a plurality of scan driving signals to the different scan lines in the display area 122 based on a start pulse signal STV12.

In the display areas 121 and 122 shown in FIG. 1, the horizontal axis direction represents time, and the vertical axis direction represents different scan lines. In the same scan driving circuit, the pulse signal is transmitted between different shift registers step by step, which causes the transition time of the scan driving signal to become gradually larger. The transition time includes at least one of a rising time Tr and a falling time Tf. As shown in FIG. 1, the rising time Tr and the falling time Tf of the scan driving signal output by the last-stage shift register of the scan driving circuit 111 are significantly greater than the rising time Tr and the falling time Tf of the scan driving signal output by the first-stage shift register of the scan driving circuit 111. Similarly, in the scan driving circuit 112, the rising time Tr and the falling time Tf of the scan driving signal output by the last-stage shift register are significantly greater than the rising time Tr and the falling time Tf of the scan driving signal output by the first-stage shift register. Generally speaking, the rising time Tr (or the falling time Tf) of the scan driving signals output by the first-stage shift registers in the different scan driving circuits 111 and 112 are similar to each other. That is, there is a non-negligible difference in the rising time Tr (or the falling time Tf) of the scan driving signal at the junction of the display areas 121 and 122. The difference may cause horizontal stripes at the folded portion of the display panel 100 (the junction of the display areas 121 and 122). How to reduce the horizontal stripe phenomenon is one of the many technical issues in this field.

It should be noted that the content of the "BACKGROUND" section is used to help understand the disclosure. Some of the content (or all of the content) disclosed in the "BACKGROUND" section may not be known to those of ordinary skill in the art. The content disclosed in the "BACKGROUND" section does not mean that the content has been known to those of ordinary skill in the art before the application of the disclosure.

SUMMARY

The disclosure provides a driving integrated circuit for driving different scan driving circuits of a display panel to reduce the horizontal stripe phenomenon.

In an embodiment of the disclosure, the driving integrated circuit includes a first output buffer and a second output buffer. The first output buffer generates a first start pulse signal to a first scan driving circuit of the display panel. The first scan driving circuit sequentially generates a first plurality of scan driving signals based on the first start pulse signal, and the first scan driving signals are output to a plurality of first scan lines of the display panel. The second output buffer generates a second start pulse signal to a second scan driving circuit of the display panel. The second scan driving circuit sequentially generates a second plurality of scan driving signals based on the second start pulse signal, and the second scan driving signals are output to a plurality of second scan lines of the display panel. The earliest second scan line of the second scan lines is driven after the first scan lines are driven. The second output buffer includes a plurality of driving units, and the driving units are respectively controlled to generate the second start pulse signal having a driving ability less than a driving ability of first start pulse signal.

In an embodiment of the disclosure, the driving integrated circuit includes a first output buffer, a second output buffer, and a control circuit. The first output buffer includes at least one driving unit for generating a first start pulse signal to a first scan driving circuit of the display panel. The first scan driving circuit sequentially generates a first plurality of scan driving signals based on the first start pulse signal, and the first scan driving signals are output to a plurality of first scan lines of the display panel. The second output buffer includes at least one driving unit for generating a second start pulse signal to a second scan driving circuit of the display panel. The second scan driving circuit sequentially generates a second plurality of scan driving signals based on the second start pulse signal, and the second scan driving signals are output to a plurality of second scan lines of the display panel. The earliest second scan line of the second scan lines is driven after the first scan lines are driven. The control circuit is coupled to the first output buffer and the second output buffer. The control circuit is configured to output a plurality of control signals to the first output buffer and the second output buffer. The control circuit controls at least one of the first output buffer and the second output buffer to generate the second start pulse signal with a duty cycle less than a duty cycle of the first start pulse signal.

Based on the above, the driving integrated circuit according to the embodiments of the disclosure can drive the first scan driving circuit and the second scan driving circuit of the display panel. In some embodiments, based on the provided possible driving ability levels of the first start pulse signal and the second start pulse signal by the driving integrated circuit, the driving ability of the second start pulse signal generated by the second output buffer is less than the driving ability of the first start pulse signal generated by the first output buffer. In other embodiments, based on the provided possible duty cycles of the first start pulse signal and the second start pulse signal by the driving integrated circuit, the duty cycle of the second start pulse signal generated by the second output buffer is less than the duty cycle of the first start pulse signal generated by the first output buffer. Therefore, at the junction of the different display areas of the same display panel, the transition time (including at least one of the rising time Tr and the falling time Tf) of the scan driving signal output by the second scan driving circuit can be approximately the same as the transition time of the scan driving signal output by the first scan driving circuit, thereby reducing the horizontal stripe phenomenon.

In order to make the above-mentioned features and advantages of the disclosure clearer and easier to understand, the following embodiments are given and described in details with accompanying drawings as follows.

DESCRIPTION OF THE EMBODIMENTS

Figure 1:
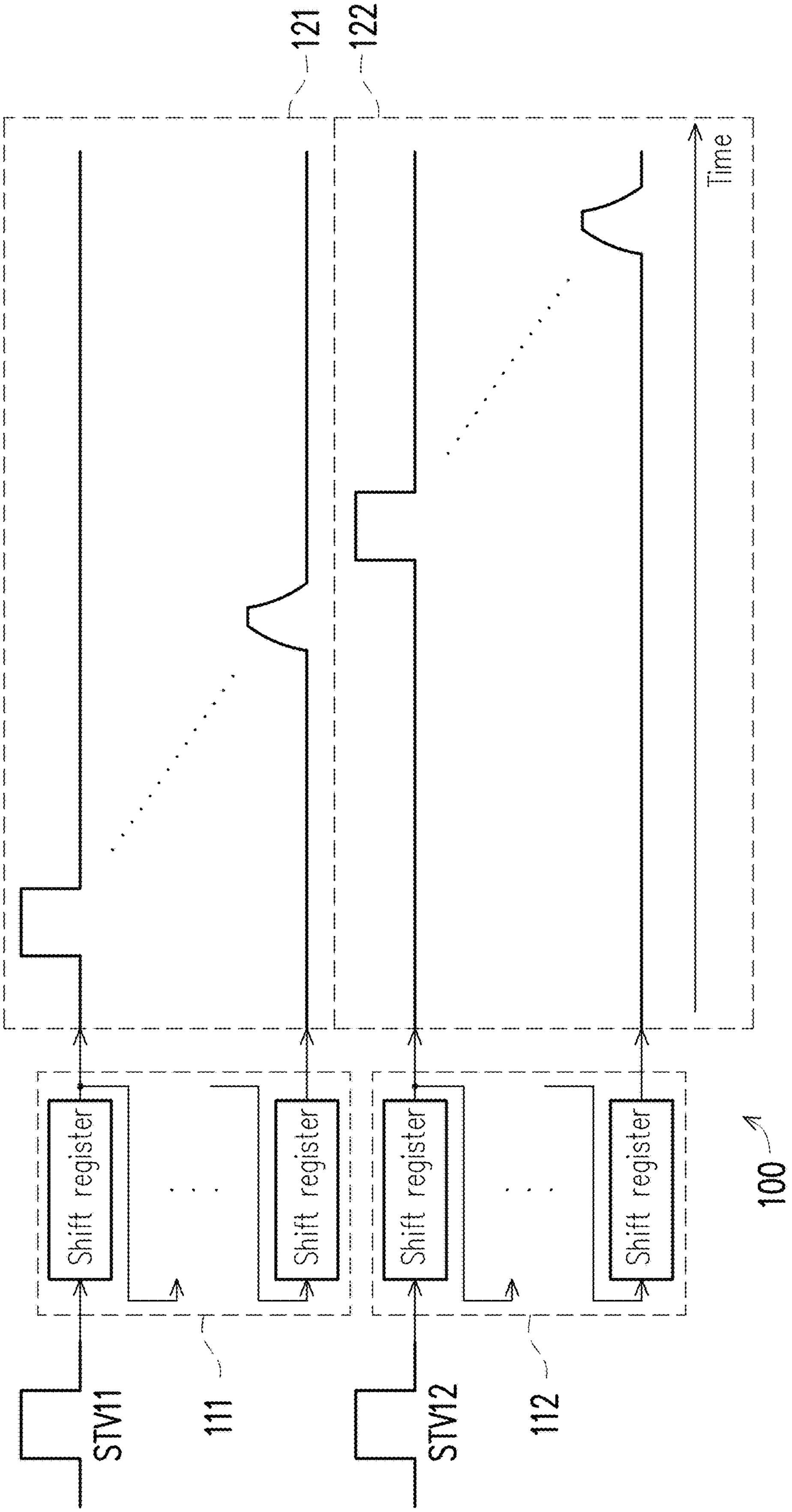
FIG. 1 (RELATED ART)
FIG. 1 is a schematic output waveform diagram of a conventional gate on array (GOA) driving circuit.

The word "coupled to (or connected to)" as used throughout this specification (including the scope of the application) may refer to any direct or indirect means of connection. For example, if it is described in the specification that a first device is coupled (or connected) to a second device, it should be construed that the first device may be directly connected to the second device, or the first device may be indirectly connected to the second device through another device or some type of connecting means. The terms "first" and "second" and the like mentioned in the full text (including the scope of the patent application) of the description of this application are used only to name the elements or to distinguish different embodiments or scopes and are not intended to limit the upper or lower limit of the number of the elements, nor is it intended to limit the order of elements. Also, where possible, elements/components/steps using the same reference numerals in drawings and embodiments represent the same or similar parts. Elements/components/steps that use the same reference numerals or use the same terminology in different embodiments may refer to relative descriptions of each other.

Figure 2:
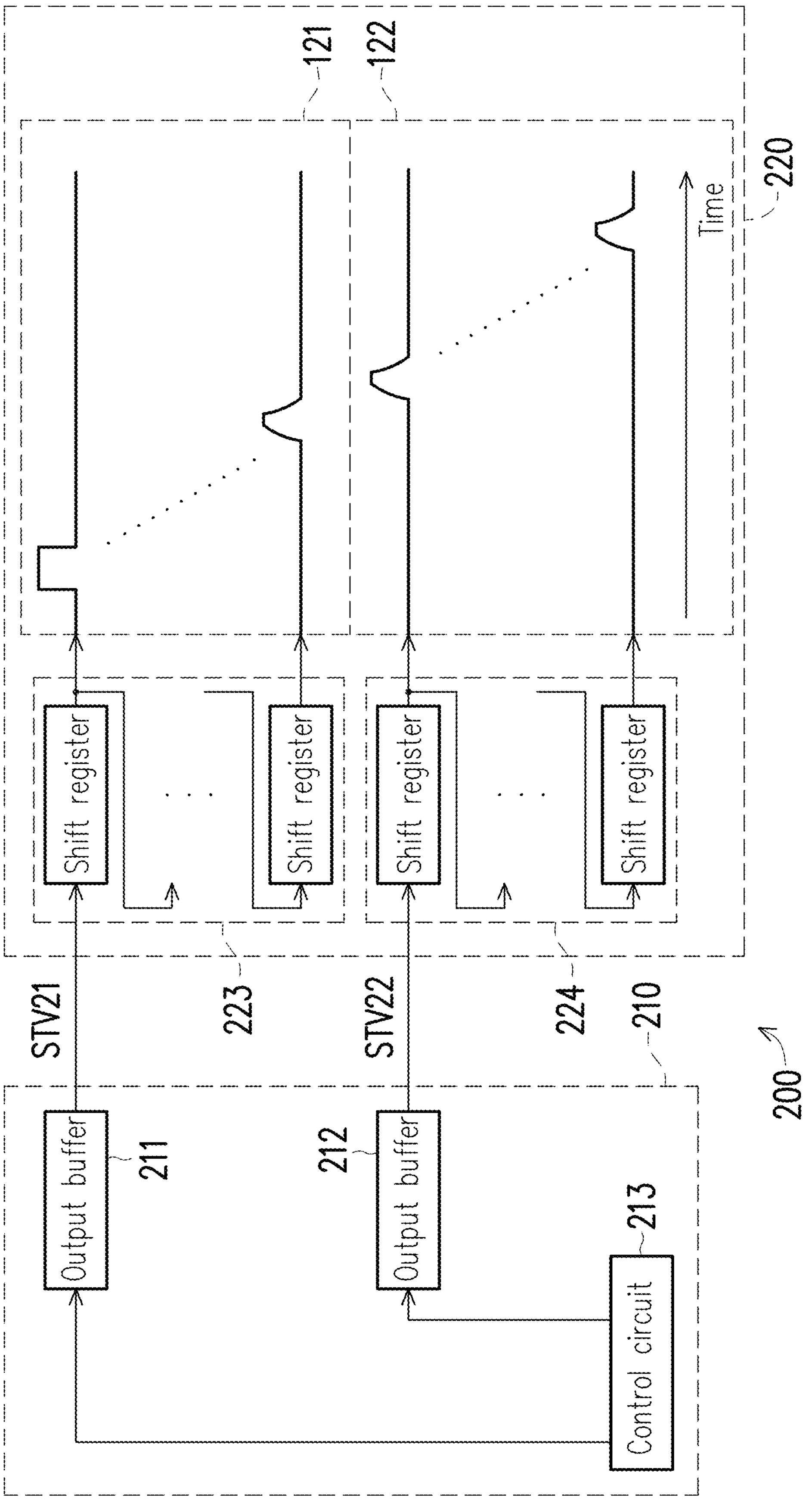
FIG. 2 is a schematic circuit block diagram of a display device according to an embodiment of the disclosure.

FIG. 2 is a schematic circuit block diagram of a display device 200 according to an embodiment of the disclosure. The display device 200 shown in FIG. 2 includes a driving integrated circuit 210 and a display panel 220. The driving integrated circuit 210 is configured to drive the display panel 220 to display images. The embodiment does not limit the type of the display panel 220. For example, depending on the actual application, the display panel 220 may be an organic light-emitting diode (OLED) display panel or other types of display panels. In order to implement the display folding function or to implement the partitioned display function, a display area of the display panel 220 may be divided into a display area 221 and a display area 222. The scan timings of the different display areas 221 and 222 are determined by different start pulse signals STV21 and STV22.

The display panel 220 shown in FIG. 2 includes scan driving circuits 223 and 224, a.k.a. GOA (gate on array) driving circuits. Any one of the scan driving circuits includes a plurality of shift registers connected in series, and the shift registers are coupled to different scan lines of the display panel 220. For example, the output terminals of the shift registers of the scan driving circuit 223 are coupled to different scan lines in the display area 221 of the display panel 220, and the output terminals of the shift registers of the scan driving circuit 224 are coupled to different scan lines in the display area 222 of the display panel 220.

The driving integrated circuit 210 includes an output buffer 211, an output buffer 212, and a control circuit 213. According to different designs, in some embodiments, the control circuit 213 may be implemented as a hardware circuit. In other embodiments, the control circuit 213 may be implemented in a combination of hardware, firmware, and software (i.e., program).

In terms of hardware, the control circuit 213 may be implemented as a logic circuit in an integrated circuit. For example, the related functions of the control circuit 213 may be implemented in various logic blocks, modules, and circuits in one or more hardware controllers, microcontrollers, hardware processors, microprocessors, application-specific integrated circuits (ASIC), digital signal processors (DSP), field programmable gate arrays (FPGA), central processing units, and/or any other processing unit. The related functions of the control circuit 213 can be implemented as hardware circuits, such as various logic blocks, modules, and circuits in integrated circuits, using hardware description languages (such as Verilog HDL or VHDL) or other suitable programming languages.

In terms of hardware combined with software and/or firmware, the related functions of the control circuit 213 can be implemented as programming codes. For example, the control circuit 213 is implemented using general programming languages (such as C, C++, or assembly language) or other suitable programming languages. The programming code can be recorded/stored in a "non-transitory machine-readable storage medium". In some embodiments, the non-transitory machine-readable storage medium includes, for example, a semiconductor memory and/or a storage device. The storage device includes a hard disk drive (HDD), a solid-state drive (SSD), flash memory, or other storage devices. The electronic device (such as a CPU, a hardware controller, a microcontroller, a hardware processor, or a microprocessor) can read and execute the programming code from the non-transitory machine-readable storage medium, thereby achieving the related functions of the control circuit 213.

The control circuit 213 is coupled to the output buffers 211 and 212. Based on the control of the control circuit 213, the output buffer 211 generates the start pulse signal STV21 to the scan driving circuit 223 of the display panel 220, and the output buffer 212 generates the start pulse signal STV22 to the scan driving circuit 224 of the display panel 220. The scan driving circuit 223 sequentially generates a first plurality of scan driving signals based on the start pulse signal STV21, and the first scan driving signals are output to different first scan lines in the display area 221 of the display panel 220. The earliest second scan line of the second scan lines in the display area 222 (the scan line of the closest display area 221 in the display area 222) is driven after the first scan lines in the display area 221 are driven. The scan driving circuit 224 sequentially generates a second plurality of scan driving signals to different second scan lines in the display area 222 of the display panel 220 based on the start pulse signal STV22.

FIG. 2 shows the waveforms and timings of the scan driving signals of the different scan lines in the display areas 221 and 222. In the display areas 221 and 222 shown in FIG. 2, the horizontal axis direction represents time, and the vertical axis direction represents different scan lines. Each of the output buffers 211 and 212 includes a plurality of driving units (not shown in FIG. 2, but will be described in various embodiments later), and the driving units are respectively controlled by the control circuit 213. Based on the control of the control circuit 213, the driving ability of the start pulse signal STV22 generated by the output buffer 212 is less than the driving ability of the start pulse signal STV21. This means that the driving ability of the second scan driving signal output by the first-stage shift register of the scan driving circuit 224 can match the driving ability of the first scan driving signal output by the last-stage shift register of the scan driving circuit 223. In other words, the transition time of the first scan driving signal of the last scan line (lower scan line) in the display area 221 can match the transition time of the second scan driving signal of the first scan line (upper scan line) in the display area 222. The transition time includes at least one of a rising time Tr and a falling time Tf.

In summary, the driving integrated circuit 210 provided in the embodiment can drive the scan driving circuits 223 and 224 of the display panel 220. Based on the different driving abilities of the start pulse signals STV21 and STV22 by the driving integrated circuit 210, the driving ability of the start pulse signal STV22 generated by the output buffer 212 is less than the driving ability of the start pulse signal STV21 generated by the output buffer 211. Therefore, at the junction of the different display areas 221 and 222 of the same display panel 220, the rising time Tr (or falling time Tf) of the second scan driving signal output by the scan driving circuit 224 can be approximately the same as the rising time Tr (or falling time Tf) of the first scan driving signal output by the scan driving circuit 223, thereby reducing the horizontal stripe phenomenon.

Figure 3:
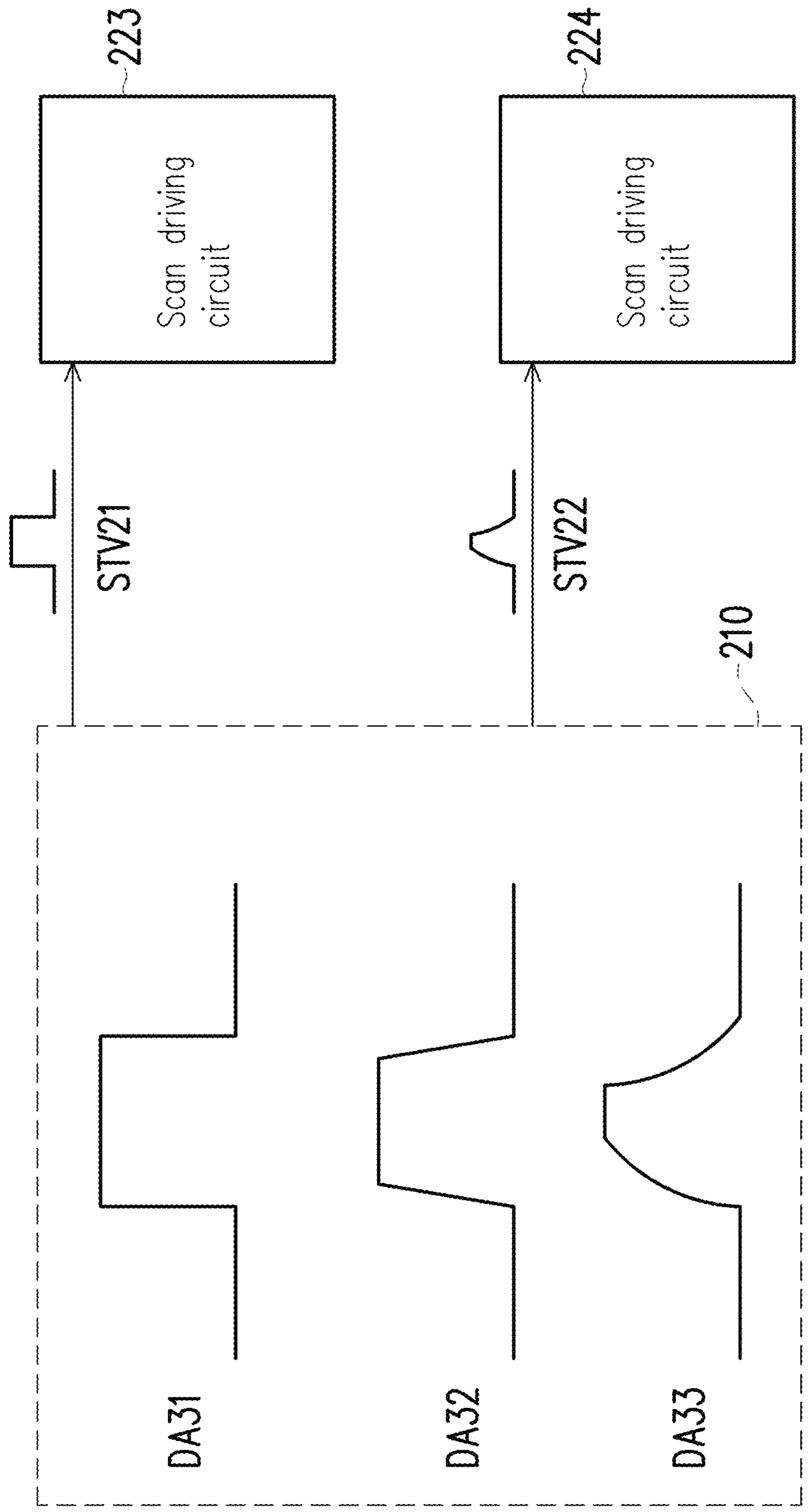
FIG. 3 is a schematic waveform diagram of a driving integrated circuit outputting start pulse signals with different driving abilities according to an embodiment of the disclosure.

FIG. 3 is a schematic waveform diagram of the driving integrated circuit 210 outputting start pulse signals STV21 and STV22 with different driving abilities according to an embodiment of the disclosure. Referring to FIG. 2 and FIG. 3, driving ability levels DA31, DA32 and DA33 are different and they are possible driving ability levels that the output buffer 212 can provide. The actual number of the driving ability levels available to be selected is according to the actual design.

Referring to FIG. 2 and FIG. 3 for example, the driving ability level DA31 is greater than the driving ability level DA32, and the driving ability level DA32 is greater than the driving ability level DA33. Based on the control of the control circuit 213, the driving ability of the start pulse signal STV22 can be set to be less than the driving ability of the start pulse signal STV21. For example, the control circuit 213 may set the output buffer 211 (which generates the start pulse signal STV21) to the driving ability level DA31 and set the output buffer 212 (which generates the start pulse signal STV22) to the driving ability level DA32 or DA33, which may be determined based on how large the driving ability of the first scan driving signal output by the last-stage shift register of the scan driving circuit 223 is. In the example of FIG. 3, the output buffer 212 is set to the driving ability level DA33 such that the start pulse signal STV22 has the driving ability level DA33. In such a way, the driving ability of the second scan driving signal output by the first-stage shift register of the scan driving circuit 224 can match the driving ability of the first scan driving signal output by the last-stage shift register of the scan driving circuit 223.

Figure 4:
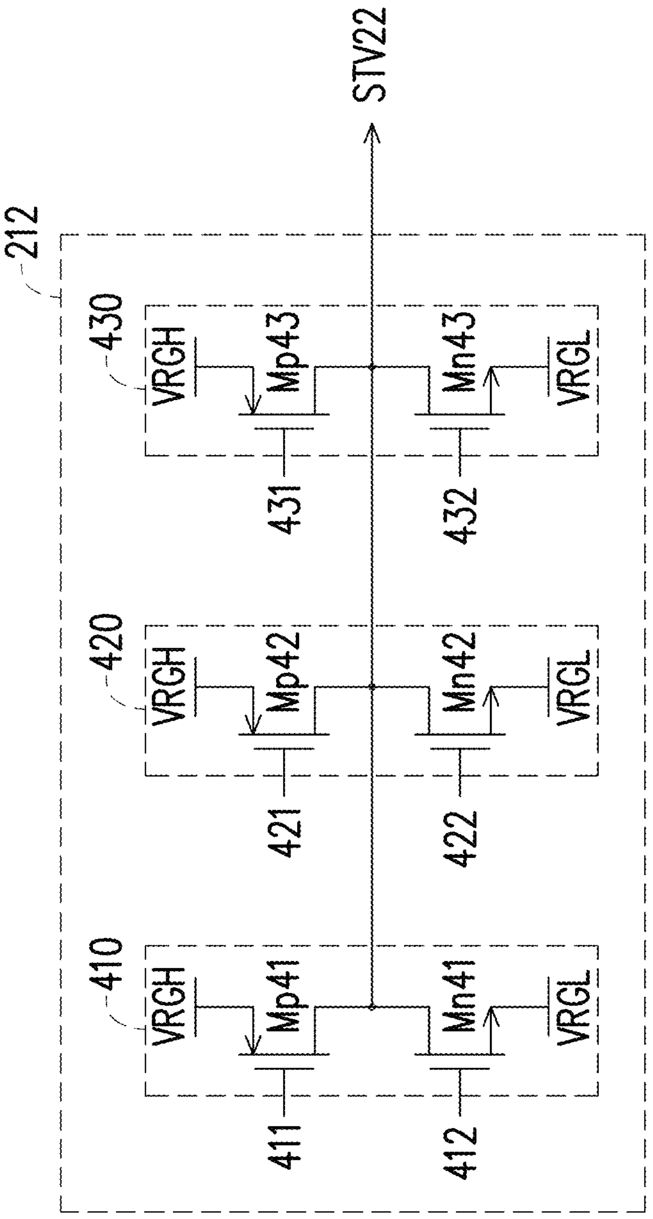
FIG. 4 is a schematic circuit block diagram of an output buffer according to an embodiment of the disclosure.

FIG. 4 is a schematic circuit block diagram of the output buffer 212 according to an embodiment of the disclosure. The output buffer 212 shown in FIG. 4 can be used as one of many implementation examples of the output buffer 212 shown in FIG. 2. The output buffer 211 shown in FIG. 2 may be same as the output buffer 212 and deduced with reference to the related description of the output buffer 212, and therefore it is not repeated herein. In the embodiment shown in FIG. 4, the output buffer 212 includes a plurality of driving units, such as driving units 410, 420, and 430. FIG. 4 shows three driving units 410 to 430. However, the actual number of the driving units of the output buffer 212 can be determined according to the actual design.

Referring to FIG. 2, FIG. 3, and FIG. 4, the control circuit 213 outputs a plurality of control signals 411, 412, 421, 422, 431, and 432 to respectively turn on or turn off the driving units 410 to 430 of the output buffer 212. The driving unit 410 includes a pull-up transistor Mp41 and a pull-down transistor Mn41. The first terminal (for example, the source) of the pull-up transistor Mp41 is coupled to a voltage VRGH (a first voltage). The actual level of the voltage VRGH can be determined according to the actual design. For example, the voltage VRGH can be 8 V or other fixed voltages. The second terminal (for example, the drain) of the pull-up transistor Mp41 is coupled to the output terminal of the output buffer 212. The control terminal (for example, the gate) of the pull-up transistor Mp41 is controlled by the control signal 411 provided by the control circuit 213. The first terminal (for example, the source) of the pull-down transistor Mn41 is coupled to a voltage VRGL (a second voltage). The actual level of the voltage VRGL can be determined according to the actual design. For example, the voltage VRGL can be −8 V or other fixed voltages. The second terminal (for example, the drain) of the pull-down transistor Mn41 is coupled to the output terminal of the output buffer 212. The control terminal (for example, the gate) of the pull-down transistor Mn41 is controlled by the control signal 412 provided by the control circuit 213.

Similarly, the driving unit 420 includes a pull-up transistor Mp42 and a pull-down transistor Mn42, and the driving unit 430 includes a pull-up transistor Mp43 and a pull-down transistor Mn43. The control terminal (for example, the gate) of the pull-up transistor Mp42 is controlled by the control signal 421 provided by the control circuit 213. The control terminal (for example, the gate) of the pull-down transistor Mn42 is controlled by the control signal 422 provided by the control circuit 213. The control terminal (for example, the gate) of the pull-up transistor Mp43 is controlled by the control signal 412 provided by the control circuit 213. The control terminal (for example, the gate) of the pull-down transistor Mn43 is controlled by the control signal 432 provided by the control circuit 213.

In a case that the control circuit 213 sets the output buffer 212 to the driving ability level DA31, the control circuit 213 enables the driving units 410 to 430. In order to pull up the start pulse signal STV22 to the voltage VRGH, the control circuit 213 turns on the pull-up transistors Mp41, Mp42, and Mp43 and turns off the pull-down transistors Mn41, Mn42, and Mn43. In order to pull down the start pulse signal STV22 to the voltage VRGL, the control circuit 213 turns on the pull-down transistors Mn41, Mn42, and Mn43 and turns off the pull-up transistors Mp41, Mp42, and Mp43. Therefore, the output buffer 212 can have the maximum driving ability at the driving ability level DA31.

In another case that the control circuit 213 sets the output buffer 212 to the driving ability level DA32, the control circuit 213 can disable (that is, turn off) one of the driving units 410 to 430. For example, the control circuit 213 can enable the driving units 410 to 420 and disable the driving unit 430. In order to pull up the start pulse signal STV22 to the voltage VRGH, the control circuit 213 can turn on the pull-up transistors Mp41 and Mp42 and turn off the pull-down transistors Mn41 and Mn42 (the transistors Mn43 and Mp43 remain turned off). In order to pull down the start pulse signal STV22 to the voltage VRGL, the control circuit 213 can turn on the pull-down transistors Mn41 and Mn42 and turn off the pull-up transistors Mp41 and Mp42 (and the transistors Mn43 and Mp43 remain turned off). Therefore, the output buffer 212 may have the second largest driving ability at the driving ability level DA32.

In another case that the control circuit 213 sets the output buffer 212 to the driving ability level DA33, the control circuit 213 can disable (turned off) two of the driving units 410 to 430. For example, the control circuit 213 can enable the driving unit 410 and disable the driving units 420 to 430. In order to pull up the start pulse signal STV22 to the voltage VRGH, the control circuit 213 can turn on the pull-up transistor Mp41 and turn off the pull-down transistor Mn41 (and the transistors Mn42, Mn43, Mp42, and Mp43 remain turned off). In order to pull down the start pulse signal STV22 to the voltage VRGL, the control circuit 213 turns on the pull-down transistor Mn41 and turns off the pull-up transistor Mp41 (the transistors Mn42, Mn43, Mp42, and Mp43 remain turned off). Therefore, the output buffer 212 may have the minimum driving ability at the driving ability level DA33.

The output buffer 211 shown in FIG. 2 may be deduced with reference to the related description of the output buffer 212 shown in FIG. 4. Based on the control of the control circuit 213, the number of the driving units that are active for generating the start pulse signal STV22 in the output buffer 212 is less than the number of the driving units that are active for generating the start pulse signal STV21 in the output buffer 211. Therefore, the driving ability of the start pulse signal STV22 generated by the output buffer 212 is less than the driving ability of the start pulse signal STV21 generated by the output buffer 211.

Figure 5:
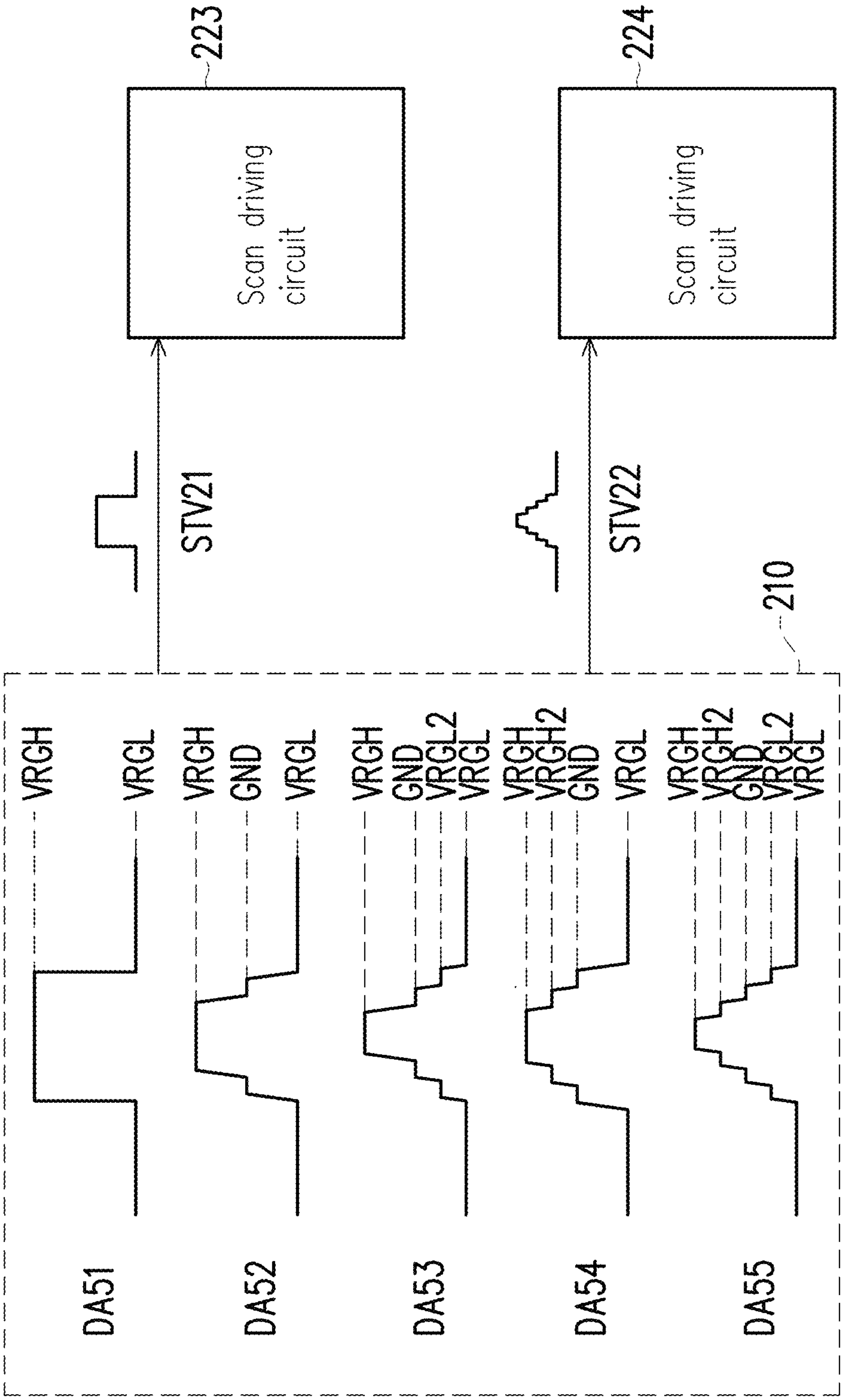
FIG. 5 is a schematic waveform diagram of a driving integrated circuit outputting start pulse signals with different driving abilities according to another embodiment of the disclosure.

FIG. 5 is a schematic waveform diagram of the driving integrated circuit 210 outputting different start pulse signals STV21 and STV22 with different driving abilities according to another embodiment of the disclosure. Referring to FIG. 2 and FIG. 5, the driving ability levels DA51 to DA55 are different and they are possible driving ability levels that the output buffer 212 can provide. As shown in FIG. 5, the start pulse signal STV22 (or STV21) goes through at least one middle voltage during transiting from the high voltage VRGH to the low voltage VRGL and from the low voltage VRGL to the high voltage VRGH. The middle voltage is between the high voltage VRGH and the low voltage VRGL.

The driving ability levels DA51 to DA55 are different driving abilities. For example, the driving ability level DA51 is greater than the driving ability level DA52, the driving ability level DA52 is greater than the driving ability level DA53, the driving ability level DA53 is greater than or equal to the driving ability level DA54, and the driving ability level DA54 is greater than the driving ability level DA55.

Based on the control of the control circuit 213, the driving ability of the start pulse signal STV22 can be less than the driving ability of the start pulse signal STV21. For example, the control circuit 213 may set the output buffer 211 (which generates the start pulse signal STV21) to the largest driving ability level DA51 and set the output buffer 212 (which generates the start pulse signal STV22) to one of the driving ability level DA52 to DA55, which may be determined based on how large the driving ability of the first scan driving signal output by the last-stage shift register of the scan driving circuit 223 is. In the example of FIG. 5, the output buffer 212 is set to the driving ability level DA55 such that the start pulse signal STV22 has the driving ability level DA55. In such a way, the driving ability of the second scan driving signal output by the first-stage shift register of the scan driving circuit 224 can match the driving ability of the first scan driving signal output by the last-stage shift register of the scan driving circuit 223.

Figure 6:
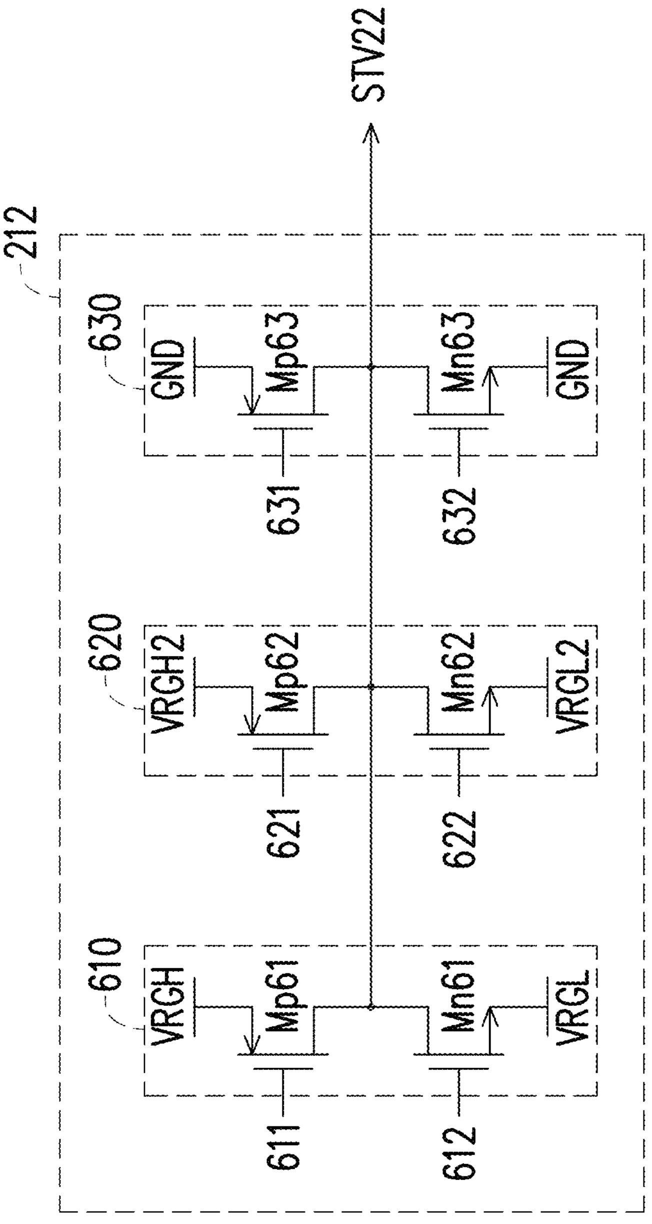
FIG. 6 is a schematic circuit block diagram of an output buffer according to another embodiment of the disclosure.

FIG. 6 is a schematic circuit block diagram of the output buffer 212 according to another embodiment of the disclosure. The output buffer 212 shown in FIG. 6 can be used as one of many implementation examples of the output buffer 212 shown in FIG. 2. In the embodiment shown in FIG. 6, the output buffer 212 includes a plurality of driving units, such as driving units 610, 620, and 630, and the output buffer 211 may be same as the output buffer 212 shown in FIG. 6 and deduced with reference to the related description, and therefore it is not repeated herein. FIG. 6 shows three driving units 610 to 630. However, the actual number of the driving units of the output buffer 212 can be determined according to the actual design.

Referring to FIG. 2, FIG. 5, and FIG. 6, the control circuit 213 outputs a plurality of control signals 611, 612, 621, 622, 631, and 632 to respectively turn on or turn off the driving units 610 to 630 of the output buffer 212. The driving unit 610 includes a pull-up transistor Mp61 and a pull-down transistor Mn61, the driving unit 620 includes a pull-up transistor Mp62 and a pull-down transistor Mn62, and the driving unit 630 includes a pull-up transistor Mp63 and a pull-down transistor Mn63. The first terminals (for example, the sources) of the pull-up transistors Mp61, Mp62, and Mp63 are coupled to different "first voltages", such as voltages VRGH, VRGH2, and GND. The actual levels of the voltages VRGH, VRGH2, and GND can be determined according to the actual design. For example, the voltage VRGH may be 8 V or other fixed voltages, the voltage VRGH2 may be 4 V or other fixed voltages, and the voltage GND may be 0 V or other fixed voltages. The second terminals (for example, the drains) of the pull-up transistors Mp61, Mp62, and Mp63 are coupled to the output terminal of the output buffer 212.

The first terminals (such as the sources) of the pull-down transistors Mn61, Mn62, and Mn63 are coupled to different "second voltages", such as voltages VRGL, VRGL2, and GND. The actual levels of the voltages VRGL, VRGL2, and GND can be determined according to the actual design. For example, the voltage VRGL may be −8 V or other fixed voltages, the voltage VRGL2 may be −4 V or other fixed voltages, and the voltage GND may be 0 V or other fixed voltages. The second terminals (for example, the drains) of the pull-down transistors Mn61, Mn62, and Mn63 are coupled to the output terminal of the output buffer 212.

The control terminal (for example, the gate) of the pull-up transistor Mp61 is controlled by the control signal 611 provided by the control circuit 213. The control terminal (for example, the gate) of the pull-down transistor Mn61 is controlled by the control signal 612 provided by the control circuit 213. The control terminal (for example, the gate) of the pull-up transistor Mp62 is controlled by the control signal 621 provided by the control circuit 213. The control terminal (for example, the gate) of the pull-down transistor Mn62 is controlled by the control signal 622 provided by the control circuit 213. The control terminal (for example, the gate) of the pull-up transistor Mp63 is controlled by the control signal 631 provided by the control circuit 213. The control terminal (for example, the gate) of the pull-down transistor Mn63 is controlled by the control signal 632 provided by the control circuit 213.

In a case that the control circuit 213 sets the output buffer 212 to the driving ability level DA51, the control circuit 213 enables the driving unit 610 and disables (turns off) the driving units 620 and 630 (and the transistors Mn62, Mp62, Mn63, and Mp63 remain turned off). In order to pull up the start pulse signal STV22 to the voltage VRGH, the control circuit 213 turns on the pull-up transistor Mp61 and turns off the pull-down transistor Mn61. In order to pull down the start pulse signal STV22 to the voltage VRGL, the control circuit 213 turns on the pull-down transistor Mn61 and turns off the pull-up transistor Mp61.

In the driving ability levels DA52 to DA55, the start pulse signal STV22 (or STV21) goes through at least one middle voltage during transiting from the high voltage VRGH to the low voltage VRGL and from the low voltage VRGL to the high voltage VRGH. The high voltage VRGH, the low voltage VRGL, and the middle voltage are selected from the "first voltages" (for example, the voltages VRGH, VRGH2, and GND) and "second voltages" (the voltages VRGL, VRGL2, and GND). The middle voltage is between the high voltage VRGH and the low voltage VRGL.

In another case that the control circuit 213 sets the output buffer 212 to the driving ability level DA52, the control circuit 213 enables the driving units 610 and 630 and disables (turns off) the driving unit 620 (and the transistors Mn62 and Mp62 remain turned off). In order to pull up the start pulse signal STV22 from the voltage VRGL to the voltage GND, the control circuit 213 turns on the pull-up transistor Mp63 and turns off the transistors Mp61, Mn61, and Mn63. Alternatively, in order to pull up the start pulse signal STV22 from the voltage VRGL to the voltage GND, the control circuit 213 turns on not only the pull-up transistor Mp63 but also the pull-down transistor Mn63, and turns off the transistors Mp61 and Mn61. In order to pull up the start pulse signal STV22 from the voltage GND to the voltage VRGH, the control circuit 213 turns on the pull-up transistor Mp61 and turns off the transistors Mn61, Mn63, and Mp63. In order to pull down the start pulse signal STV22 from the voltage VRGH to the voltage GND, the control circuit 213 turns on the pull-down transistor Mn63 and turns off the transistors Mp61, Mn61, and Mp63. Alternatively, in order to pull down the start pulse signal STV22 from the voltage VRGH to the voltage GND, the control circuit 213 turns on not only the pull-down transistor Mn63 but also the pull-up transistor Mp63, and turns off the transistors Mp61 and Mn61. In order to pull down the start pulse signal STV22 from the voltage GND to the voltage VRGL, the control circuit 213 turns on the pull-down transistor Mn61 and turns off the transistors Mp61, Mp63, and Mn63.

In another case that the control circuit 213 sets the output buffer 212 to the driving ability level DA53, the control circuit 213 enables the driving units 610, 620, and 630. In order to pull up the start pulse signal STV22 from the voltage VRGL to the voltage VRGL2, the control circuit 213 turns on the pull-down transistor Mn62 and turns off the other transistors. In order to pull up the start pulse signal STV22 from the voltage VRGL2 to the voltage GND, the control circuit 213 turns on the pull-up transistor Mp63 and turns off the other transistors. Alternatively, in order to pull up the start pulse signal STV22 from the voltage VRGL2 to the voltage GND, the control circuit 213 turns on not only the pull-up transistor Mp63 but also the pull-down transistor Mn63, and turns off the other transistors. In order to pull up the start pulse signal STV22 from the voltage GND to the voltage VRGH, the control circuit 213 turns on the pull-up transistor Mp61 and turns off the other transistors. In order to pull down the start pulse signal STV22 from the voltage VRGH to the voltage GND, the control circuit 213 turns on the pull-down transistor Mn63 and turns off the other transistors. Alternatively, in order to pull down the start pulse signal STV22 from the voltage VRGH to the voltage GND, the control circuit 213 turns on not only the pull-down transistor Mn63 but also the pull-up transistor Mp63, and turns off the other transistors. In order to pull down the start pulse signal STV22 from the voltage GND to the voltage VRGL2, the control circuit 213 turns on the pull-down transistor Mn62 and turns off the other transistors. In order to pull down the start pulse signal STV22 from the voltage VRGL2 to the voltage VRGL, the control circuit 213 turns on the pull-down transistor Mn61 and turns off the other transistors.

In another case that the control circuit 213 sets the output buffer 212 to the driving ability level DA54, the control circuit 213 enables the driving units 610, 620, and 630. In order to pull up the start pulse signal STV22 from the voltage VRGL to the voltage GND, the control circuit 213 turns on the pull-up transistor Mp63 and turns off the other transistors. Alternatively, in order to pull up the start pulse signal STV22 from the voltage VRGL to the voltage GND, the control circuit 213 turns on not only the pull-up transistor Mp63 but also the pull-down transistor Mn63, and turns off the other transistors. In order to pull up the start pulse signal STV22 from the voltage GND to the voltage VRGH2, the control circuit 213 turns on the pull-up transistor Mp62 and turns off the other transistors. In order to pull up the start pulse signal STV22 from the voltage VRGH2 to the voltage VRGH, the control circuit 213 turns on the pull-up transistor Mp61 and turns off the other transistors. In order to pull down the start pulse signal STV22 from the voltage VRGH to the voltage VRGH2, the control circuit 213 turns on the pull-up transistor Mp62 and turns off the other transistors. In order to pull down the start pulse signal STV22 from the voltage VRGH2 to the voltage GND, the control circuit 213 turns on the pull-down transistor Mn63 and turns off the other transistors. Alternatively, in order to pull down the start pulse signal STV22 from the voltage VRGH2 to the voltage GND, the control circuit 213 turns on not only the pull-down transistor Mn63 but also the pull-up transistor Mp63, and turns off the other transistors. In order to pull down the start pulse signal STV22 from the voltage GND to the voltage VRGL, the control circuit 213 turns on the pull-down transistor Mn61 and turns off the other transistors.

In another case that the control circuit 213 sets the output buffer 212 to the driving ability level DA55, the control circuit 213 enables the driving units 610, 620, and 630. In order to pull up the start pulse signal STV22 from the voltage VRGL to the voltage VRGL2, the control circuit 213 turns on the pull-down transistor Mn62 and turns off the other transistors. In order to pull up the start pulse signal STV22 from the voltage VRGL2 to the voltage GND, the control circuit 213 turns on the pull-up transistor Mp63 and turns off the other transistors. Alternatively, in order to pull up the start pulse signal STV22 from the voltage VRGL to the voltage GND, the control circuit 213 turns on not only the pull-up transistor Mp63 but also the pull-down transistor Mn63, and turns off the other transistors. In order to pull up the start pulse signal STV22 from the voltage GND to the voltage VRGH2, the control circuit 213 turns on the pull-up transistor Mp62 and turns off the other transistors. In order to pull up the start pulse signal STV22 from the voltage VRGH2 to the voltage VRGH, the control circuit 213 turns on the pull-up transistor Mp61 and turns off the other transistors. In order to pull down the start pulse signal STV22 from the voltage VRGH to the voltage VRGH2, the control circuit 213 turns on the pull-up transistor Mp62 and turns off the other transistors. In order to pull down the start pulse signal STV22 from the voltage VRGH2 to the voltage GND, the control circuit 213 turns on the pull-down transistor Mn63 and turns off the other transistors. Alternatively, in order to pull down the start pulse signal STV22 from the voltage VRGH2 to the voltage GND, the control circuit 213 turns on not only the pull-down transistor Mn63 but also the pull-up transistor Mp63, and turns off the other transistors. In order to pull down the start pulse signal STV22 from the voltage GND to the voltage VRGL2, the control circuit 213 turns on the pull-down transistor Mn62 and turns off the other transistors. In order to pull down the start pulse signal STV22 from the voltage VRGL2 to the voltage VRGL, the control circuit 213 turns on the pull-down transistor Mn61 and turns off the other transistors.

Figure 7:
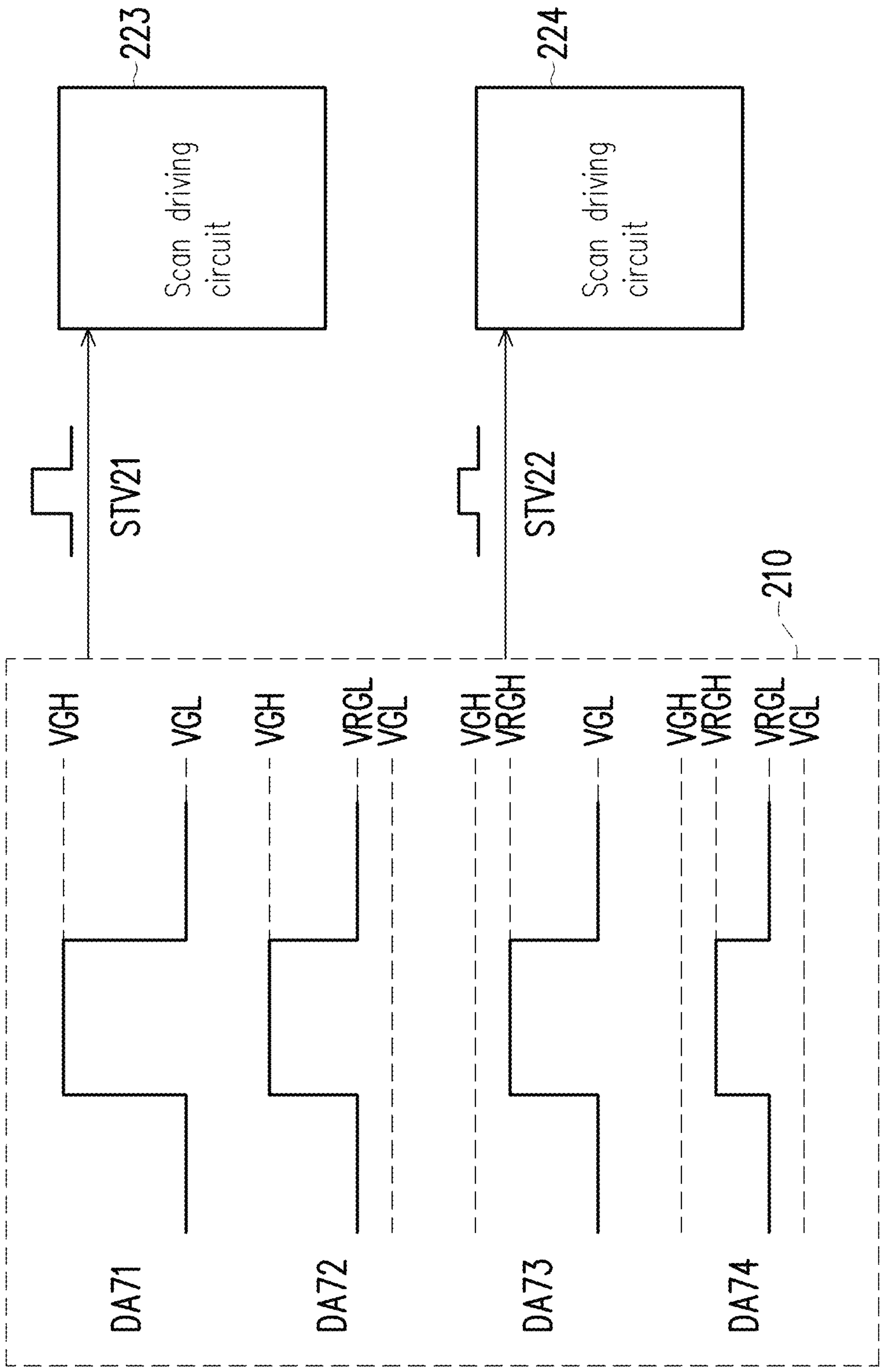
FIG. 7 is a schematic waveform diagram of a driving integrated circuit outputting start pulse signals with different driving abilities according to still another embodiment of the disclosure.

FIG. 7 is a schematic waveform diagram of the driving integrated circuit 210 outputting start pulse signals STV21 and STV22 with different driving abilities according to still another embodiment of the disclosure. Referring to FIG. 2 and FIG. 7, the four driving ability levels DA71 to DA74 are different, and they are possible driving ability levels that the output buffer 212 can provide. However, the actual number of the driving ability levels of the output buffers 211 and 212 can be determined according to the actual design. At least one of the lowest voltage of the start pulse signal STV22 and the highest voltage of the start pulse signal STV22 is configured to be different from the lowest voltage of the start pulse signal STV21 and the highest voltage of the start pulse signal STV21.

Based on the control of the control circuit 213, the driving ability of the start pulse signal STV22 cane be set to be less than the driving ability of the start pulse signal STV21. For example, the control circuit 213 may set the output buffer 211 (which generates the start pulse signal STV21) to the driving ability adjustment level DA71, and set the driving ability of the output buffer 212 (which generates the start pulse signal STV22) to one of the driving abilities DA72-DA74 smaller than the driving ability 71, which may be determined based on how large the driving ability of the first scan driving signal output by the last-stage shift register of the scan driving circuit 223 is. In the example of FIG. 7, the output buffer 212 is set to the driving ability level DA74 such that the start pulse signal STV22 has the driving ability level DA74. In such a way, the driving ability of the second scan driving signal output by the first-stage shift register of the scan driving circuit 224 can match the driving ability of the first scan driving signal output by the last-stage shift register of the scan driving circuit 223.

Figure 8:
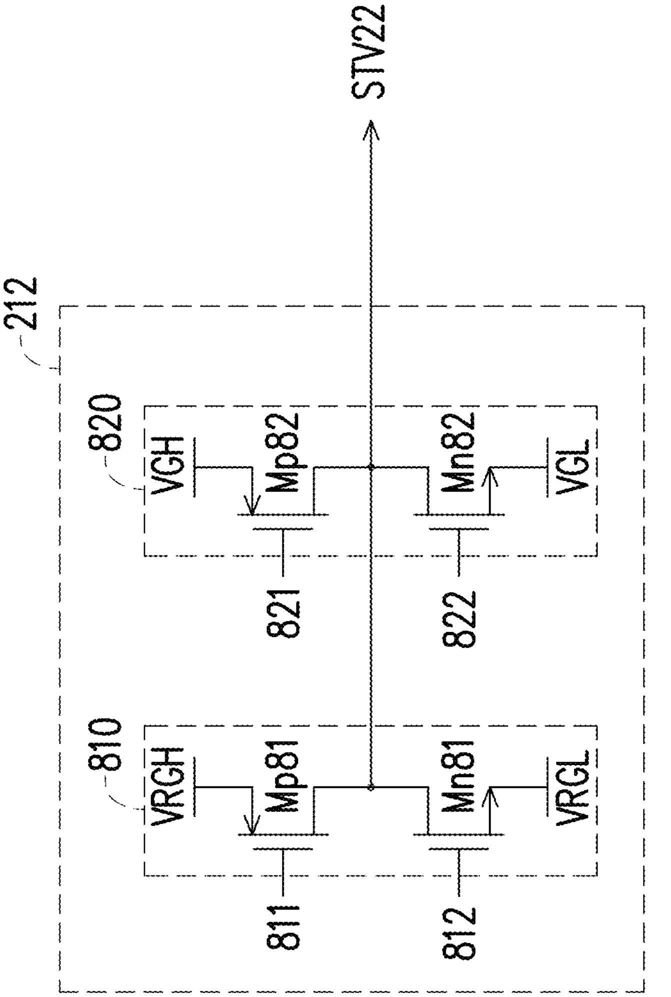
FIG. 8 is a schematic circuit block diagram of an output buffer according to still another embodiment of the disclosure.

FIG. 8 is a schematic circuit block diagram of the output buffer 212 according to still another embodiment of the disclosure. The output buffer 212 shown in FIG. 8 can be used as one of many implementation examples of the output buffer 212 shown in FIG. 2. In the embodiment shown in FIG. 8, the output buffer 212 includes a plurality of driving units, such as driving units 810 and 820 and the output buffer 211 may be same as the output buffer 212 shown in FIG. 8 and deduced with reference to the related description, and therefore it is not repeated herein. FIG. 8 shows two driving units 810 to 820. However, the actual number of the driving units of the output buffer 212 can be determined according to the actual design.

Referring to FIG. 2, FIG. 7, and FIG. 8, the control circuit 213 outputs a plurality of control signals 811, 812, 821, and 822 to respectively turn on or turn off the driving units 810 to 820 of the output buffer 212. The driving unit 810 includes a pull-up transistor Mp81 and a pull-down transistor Mn81, and the driving unit 820 includes a pull-up transistor Mp82 and a pull-down transistor Mn82. The first terminals (for example, the sources) of the pull-up transistors Mp81 and Mp82 are coupled to different “first voltages”, such as voltages VRGH and VGH. The actual levels of the voltages VRGH and VGH can be determined according to the actual design. For example, the voltage VRGH may be 8 V or other fixed voltages, and the voltage VGH may be 9 V or other fixed voltages. The second terminals (for example, the drains) of the pull-up transistors Mp81 and Mp82 are coupled to the output terminal of the output buffer 212.

The first terminals (for example, the sources) of the pull-down transistors Mn81 and Mn82 are coupled to different “second voltages”, such as voltages VRGL and VGL. The actual levels of the voltages VRGL and VGL can be determined according to the actual design. For example, the voltage VRGL may be −8 V or other fixed voltages, and the voltage VGL may be −9 V or other fixed voltages. The second terminals (for example, the drains) of the pull-down transistors Mn81 and Mn82 are coupled to the output terminal of the output buffer 212.

The control terminal (for example, the gate) of the pull-up transistor Mp81 is controlled by the control signal 811 provided by the control circuit 213. The control terminal (for example, the gate) of the pull-down transistor Mn81 is controlled by the control signal 812 provided by the control circuit 213. The control terminal (for example, the gate) of the pull-up transistor Mp82 is controlled by the control signal 821 provided by the control circuit 213. The control terminal (for example, the gate) of the pull-down transistor Mn82 is controlled by the control signal 822 provided by the control circuit 213.

In a case that the control circuit 213 sets the output buffer 212 to the driving ability level DA71, the control circuit 213 enables the driving unit 820 and disables the driving unit 810 (and the transistors Mn81 and Mp81 remain turned off). In order to pull up the start pulse signal STV22 to the voltage VGH, the control circuit 213 turns on the pull-up transistor Mp82 and turns off the pull-down transistor Mn82. In order to pull down the start pulse signal STV22 to the voltage VGL, the control circuit 213 turns on the pull-down transistor Mn82 and turns off the pull-up transistor Mp82.

In another case that the control circuit 213 sets the output buffer 212 to the driving ability level DA72, the control circuit 213 enables the driving units 810 and 820. In order to pull up the start pulse signal STV22 to the voltage VGH, the control circuit 213 turns on the pull-up transistor Mp82 and turns off the other transistors. In order to pull down the start pulse signal STV22 to the voltage VRGL, the control circuit 213 turns on the pull-down transistor Mn81 and turns off the other transistors.

In another case that the control circuit 213 sets the output buffer 212 to the driving ability level DA73, the control circuit 213 enables the driving units 810 and 820. In order to pull up the start pulse signal STV22 to the voltage VRGH, the control circuit 213 turns on the pull-up transistor Mp81 and turns off the other transistors. In order to pull down the start pulse signal STV22 to the voltage VGL, the control circuit 213 turns on the pull-down transistor Mn82 and turns off the other transistors.

In another case that the control circuit 213 sets the output buffer 212 to the driving ability level DA74, the control circuit 213 enables the driving unit 810 and disables the driving unit 820 (and the transistors Mn82 and Mp82 remain turned off). In order to pull up the start pulse signal STV22 to the voltage VRGH, the control circuit 213 turns on the pull-up transistor Mp81 and turns off the pull-down transistor Mn81. In order to pull down the start pulse signal STV22 to the voltage VRGL, the control circuit 213 turns on the pull-down transistor Mn81 and turns off the pull-up transistor Mp81.

Figure 9:
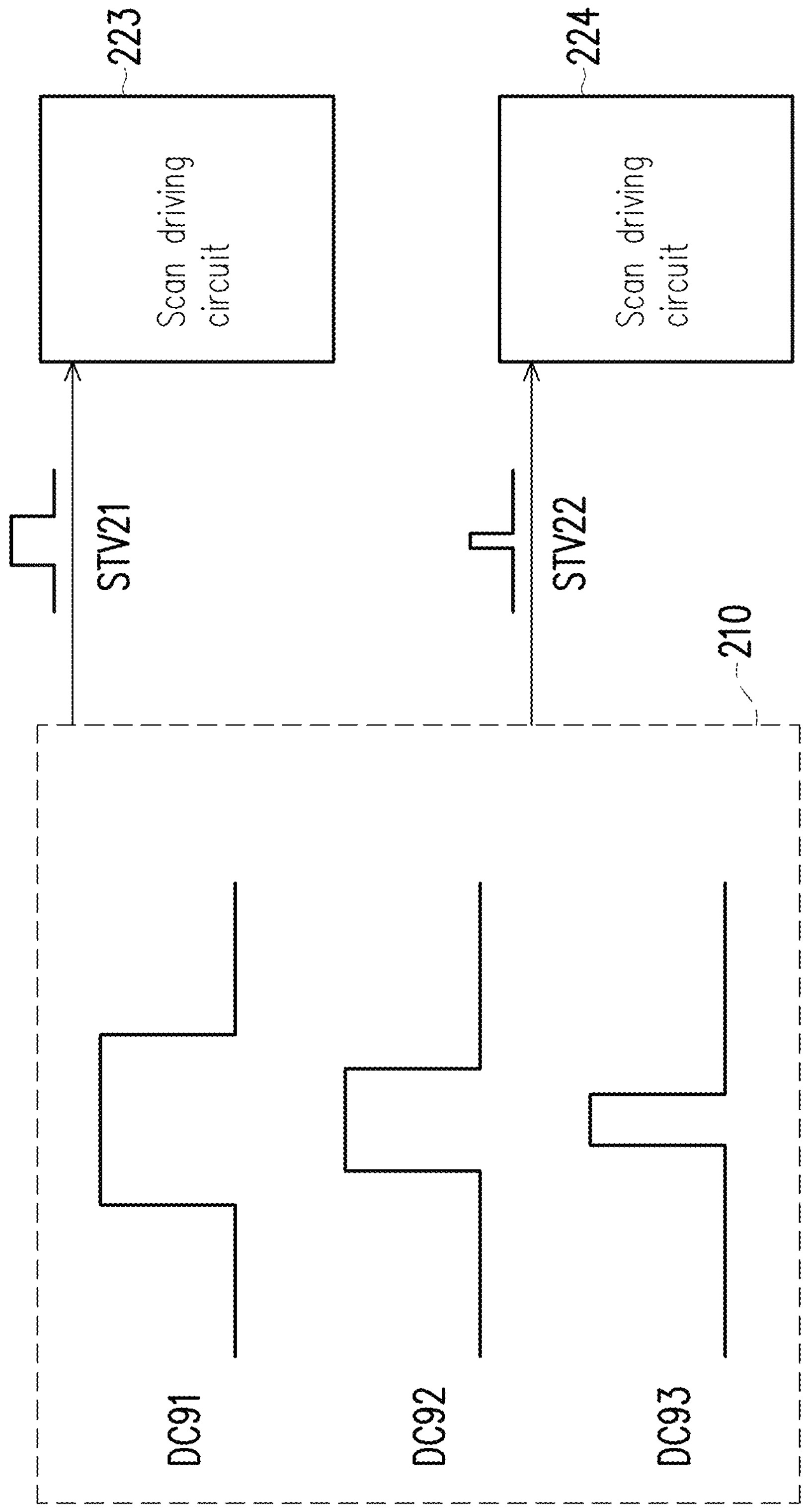
FIG. 9 is a schematic waveform diagram of a driving integrated circuit outputting start pulse signals with different driving abilities according to yet another embodiment of the disclosure.

FIG. 9 is a schematic waveform diagram of the driving integrated circuit 210 outputting the different start pulse signals STV21 and STV22 with different driving abilities according to yet another embodiment of the disclosure. Referring to FIG. 2 and FIG. 9, the start pulse signal STV21 generated by the output buffer 211 and the start pulse signal STV22 generated by the output buffer 212 may have different duty cycles, which may be determined from possible duty cycles such as DC91, DC92, and DC93 shown in FIG. 9. Different duty cycles result in different driving abilities of the start pulse signal. However, the actual number of the levels of the output buffers 211 and 212 can be determined according to the actual design. The control circuit 213 controls at least one of the output buffers 211 and 212 to generate the start pulse signal STV21 and the start pulse signal STV22 with different duty cycles. For example, the control circuit 213 may set the start pulse signal STV21 to have the duty cycle DC91 and set the start pulse signal STV22 to have the duty cycle DC93, which is smaller than DC91, so that the driving ability of the second scan driving signal output by the first-stage shift register of the scan driving circuit 224 can match the driving ability of the first scan driving signal output by the last-stage shift register of the scan driving circuit 223.

Figure 10:
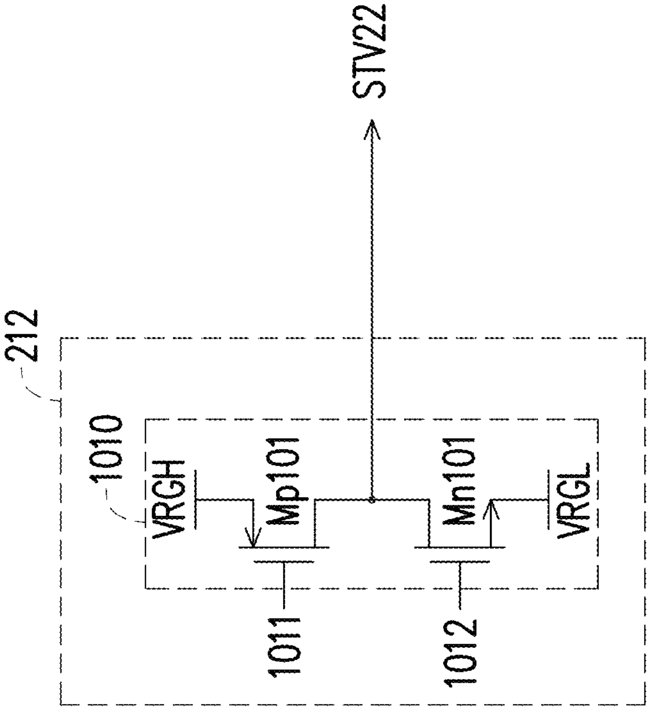
FIG. 10 is a schematic circuit block diagram of an output buffer according to yet another embodiment of the disclosure.

FIG. 10 is a schematic circuit block diagram of the output buffer 212 according to yet another embodiment of the disclosure. The output buffer 212 shown in FIG. 10 can be used as one of many implementation examples of the output buffer 212 shown in FIG. 2. The output buffer 211 shown in FIG. 2 may be deduced with reference to the related description of the output buffer 212, and therefore it is not repeated herein. In the embodiment shown in FIG. 10, the output buffer 212 includes a driving unit 1010. FIG. 10 shows a single driving unit 1010, but the actual number of the driving units of the output buffer 212 can be determined according to the actual design.

Referring to FIG. 2, FIG. 9, and FIG. 10, the driving unit 1010 includes a pull-up transistor Mp101 and a pull-down transistor Mn101. The first terminal (for example, the source) of the pull-up transistor Mp101 is coupled to the "first voltage", such as the voltage VRGH. The first terminal (such as the source) of the pull-down transistor Mn101 is coupled to the "second voltage", such as the voltage VRGL. The second terminal (for example, the drain) of the pull-up transistor Mp101 and the second terminal (for example, the drain) of the pull-down transistor Mn101 are coupled to the output terminal of the output buffer 212. The control circuit 213 outputs a plurality of control signals 1011 and 1012 to respectively turn on or turn off the pull-up transistor Mp101 and the pull-down transistor Mn101 in the driving unit 1010 of the output buffer 212, and how long the pull-up transistor Mp101 and pull-down transistor Mn101 remains in the turn-on state or turn-off state is determined by the control signals 1011 and 1012 such that the duty cycle of the start pulse signal STV22 can be set to be less than the duty cycle of the start pulse signal STV21. The control terminal (for example, the gate) of the pull-up transistor Mp101 is controlled by the control signal 1011. The control terminal (for example, the gate) of the pull-down transistor Mn101 is controlled by the control signal 1012. The duty cycle of each of the start pulse signal STV21 and the start pulse signal STV22 is determined based on the control signals that control the output buffers 211 and 212 respectively.

In summary, the driving integrated circuit 210 can drive the scan driving circuits 223 and 224 of the display panel 220. Based on the different settings of the start pulse signals STV21 and STV22 provided by the driving integrated circuit 210, the duty cycle of the start pulse signal STV22 generated by the output buffer 212 is less than the duty cycle of the start pulse signal STV21 generated by the output buffer 211. In such a way, the driving ability of the second scan driving signal output by the first-stage shift register of the scan driving circuit 224 can match the driving ability of the first scan driving signal output by the last-stage shift register of the scan driving circuit 223. Therefore, at the junction of the different display areas 221 and 222 of the same display panel 220, the transition time (including at least one of the rising time Tr and the falling time Tf) of the scan driving signal output by the scan driving circuit 224 can be approximately the same as the transition time of the scan driving signal output by the scan driving circuit 223, thereby reducing the horizontal stripe phenomenon.

Figure 11:
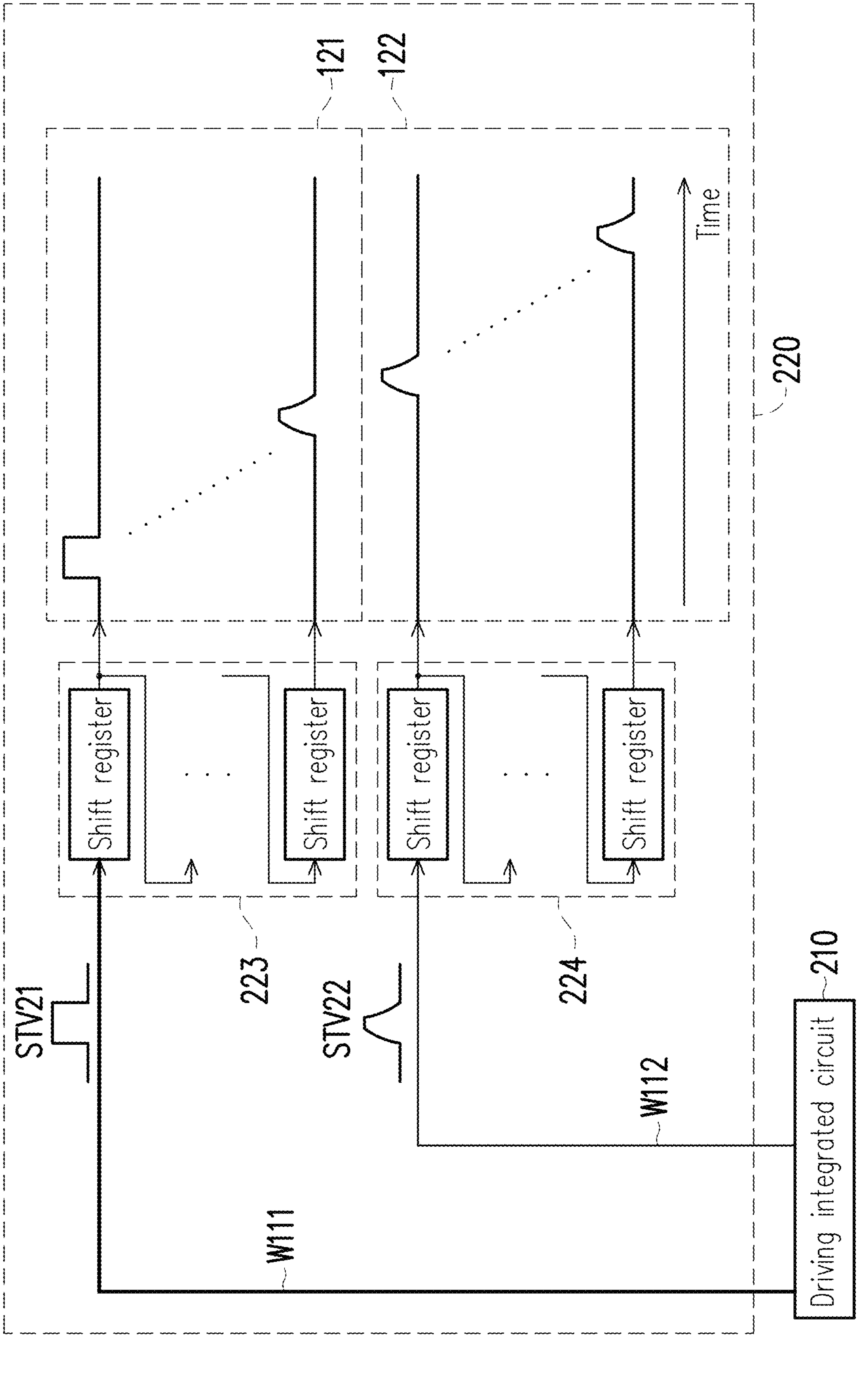
FIG. 11 is a schematic layout diagram of wires between a driving integrated circuit and a scan driving circuit according to an embodiment of the disclosure.

FIG. 11 is a schematic layout diagram of wires between the driving integrated circuit 210 and the scan driving circuit according to an embodiment of the disclosure. Referring to FIG. 2 and FIG. 11, the display panel 220 includes a first scan line group in the display area 221, a second scan line group in the display area 222, the scan driving circuit 223, the scan driving circuit 224, a transmission wire W111, and a transmission wire W112. The output terminal of the output buffer 211 of the driving integrated circuit 210 is coupled to the transmission wire W111. The driving integrated circuit 210 generates the start pulse signal STV21 to the transmission wire W111. The output terminal of the output buffer 212 of the driving integrated circuit 210 is coupled to the transmission wire W112. The driving integrated circuit 210 generates the start pulse signal STV22 to the transmission wire W112. The width of the transmission wire W111 is wider than the width of the transmission wire W112, that is, the impedance of the transmission wire W111 is less than the impedance of the transmission wire W112. Since the impedance of the transmission wire W112 that the start pulse signal STV22 is transmitted through is relatively larger, the driving ability of the second scan driving signal output by the first-stage shift register of the scan driving circuit 224 has a chance to match the driving ability of the first scan driving signal output by the last-stage shift register of the scan driving circuit 223. As a result, the rising time Tr (or falling time Tf) of the second scan driving signal output by the scan driving circuit 224 can be approximately the same as the rising time Tr (or falling time Tf) of the first scan driving signal output by the scan driving circuit 223, thereby reducing the horizontal stripe phenomenon.

Figure 12:
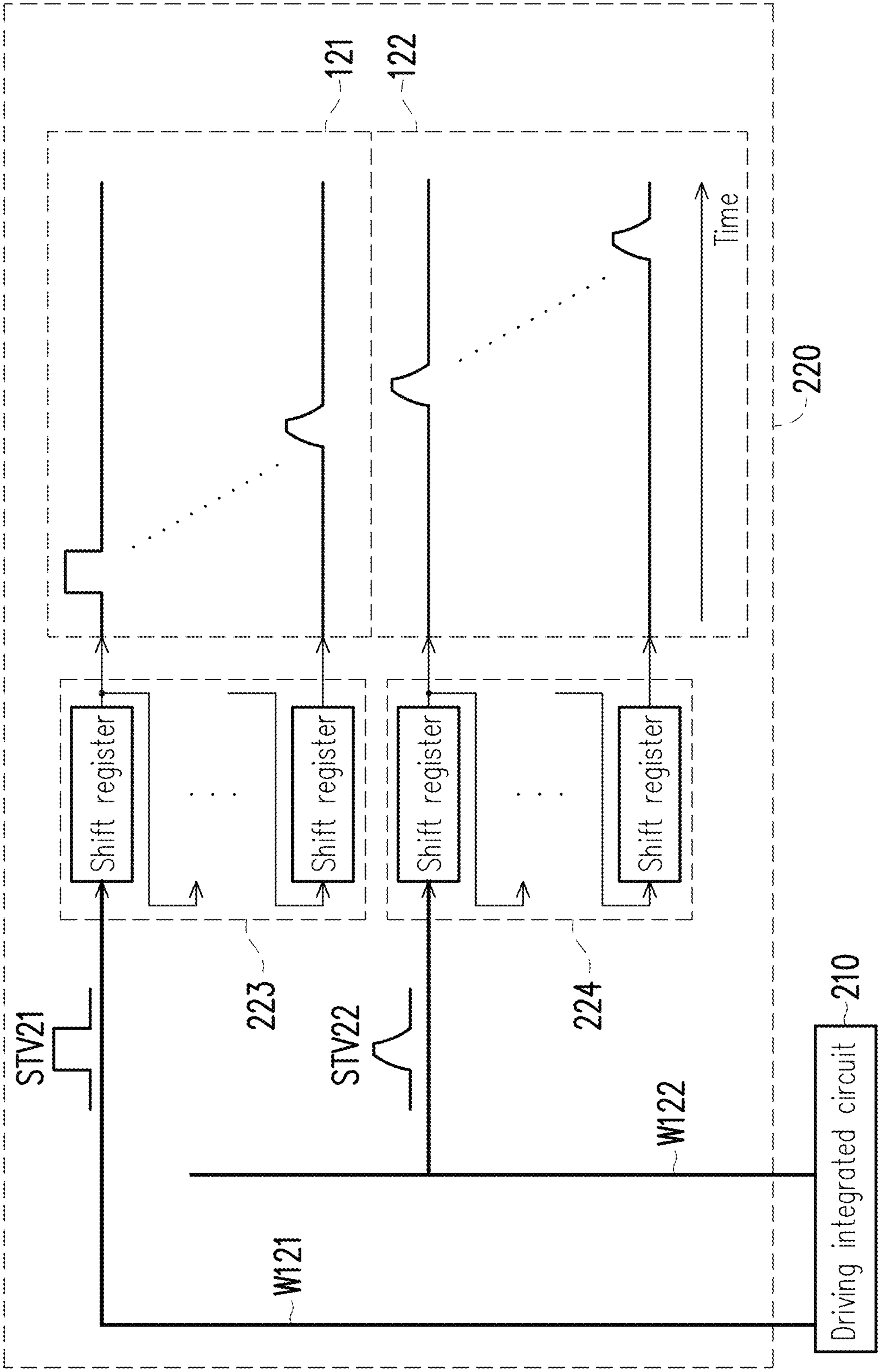
FIG. 12 is a schematic layout diagram of wires between a driving integrated circuit and a scan driving circuit according to another embodiment of the disclosure.

FIG. 12 is a schematic layout diagram of wires between the driving integrated circuit 210 and the scan driving circuit according to another embodiment of the disclosure. Referring to FIG. 2 and FIG. 12, two terminals of the transmission wire W121 are respectively coupled to the output terminal of the output buffer 211 of the driving integrated circuit 210 and the input terminal of the scan driving circuit 223. The driving integrated circuit 210 generates the start pulse signal STV21 to the transmission wire W121. Two terminals of the transmission wire W122 are respectively coupled to the output terminal of the output buffer 212 of the driving integrated circuit 210 and the input terminal of the scan driving circuit 224. The driving integrated circuit 210 generates the start pulse signal STV22 to the transmission wire W122. The routing length of the transmission wire W122 extends to the extra circuit area, so that the impedance of the transmission wire W122 is greater than the impedance of the transmission wire W121. Therefore, the impedance of the transmission wire W111 is less than the impedance of the transmission wire W112. Since the impedance of the transmission wire W122 that the start pulse signal STV22 is transmitted through is relatively larger, the driving ability of the second scan driving signal output by the first-stage shift register of the scan driving circuit 224 has a chance to match the driving ability of the first scan driving signal output by the last-stage shift register of the scan driving circuit 223. As a result, the rising time Tr (or falling time Tf) of the second scan driving signal output by the scan driving circuit 224 can be approximately the same as the rising time Tr (or falling time Tf) of the first scan driving signal output by the scan driving circuit 223, thereby reducing the horizontal stripe phenomenon.

Figure 13:
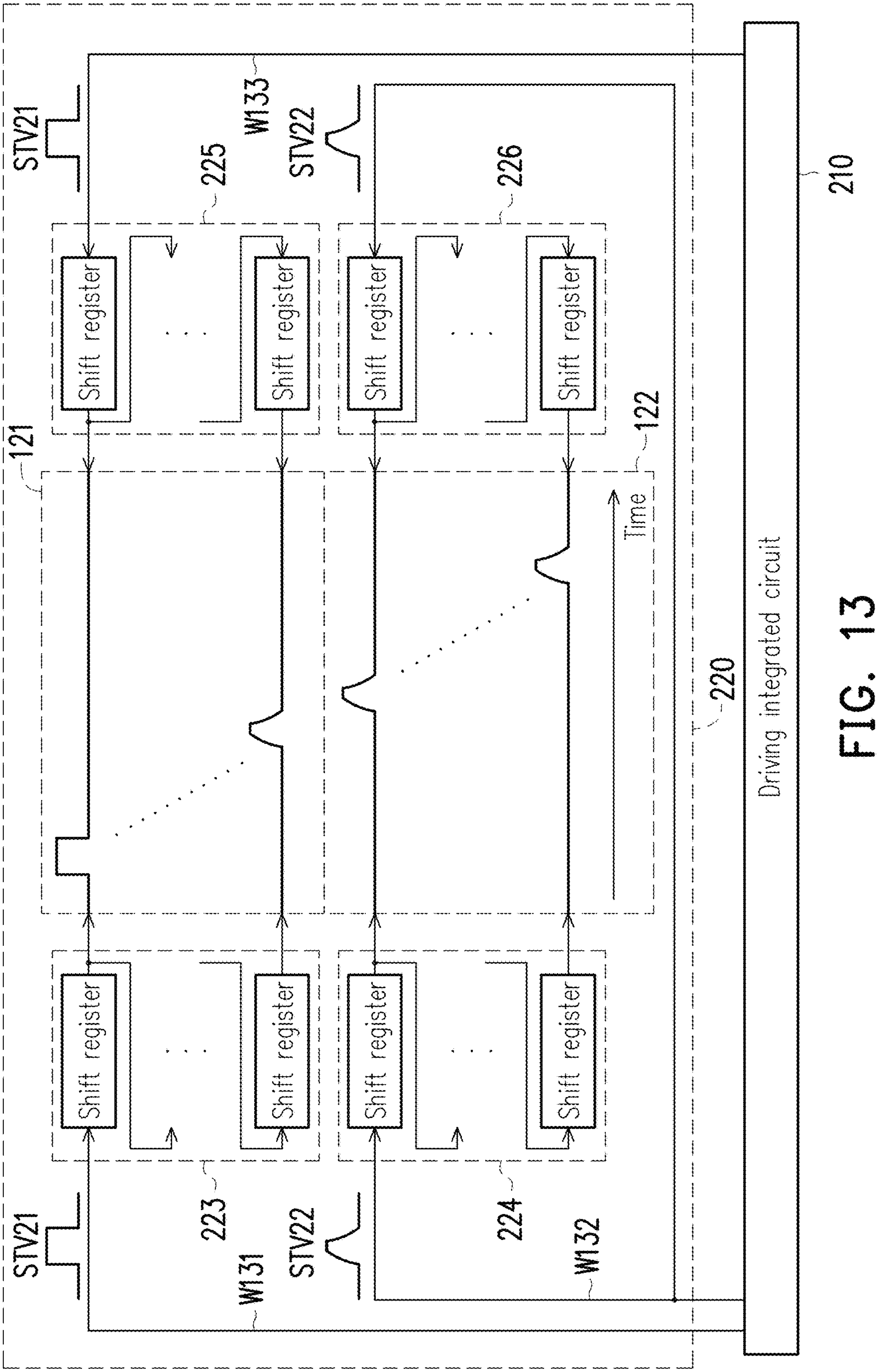
FIG. 13 is a schematic layout diagram of a display panel according to still another embodiment of the disclosure.

FIG. 13 is a schematic layout diagram of the display panel 220 according to still another embodiment of the disclosure. Referring to FIGS. 2 and 13, the display panel 220 includes the first scan line group in the display area 221, the second scan line group in the display area 222, the scan driving circuit 223, the scan driving circuit 224, a scan driving circuit 225, a scan driving circuit 226, a transmission wire W131, a transmission wire W132, and a transmission wire W133. The first output terminal of the driving integrated circuit 210 is coupled to the transmission wire W131. The start pulse signal STV21 generated by the driving integrated circuit 210 is transmitted to the scan driving circuit 223 via the transmission wire W131. The second output terminal of the driving integrated circuit 210 is coupled to the transmission wire W133. The start pulse signal STV21 generated by the driving integrated circuit 210 is transmitted to the scan driving circuit 225 via the transmission wire W133. The scan driving circuit 225 may be deduced with reference to the related description of the scan driving circuit 223, and therefore it is not repeated herein.

The third output terminal of the driving integrated circuit 210 is coupled to the transmission wire W132. The start pulse signal STV22 generated by the driving integrated circuit 210 is transmitted to the scan driving circuits 224 and 226 via the transmission wire W132. The scan driving circuit 226 may be deduced with reference to the related description of the scan driving circuit 224, and therefore it is not repeated herein. The length of the transmission wire W132 is greater than the transmission wire W131 (or W133), so that the impedance of the transmission wire W132 is greater than the impedance of the transmission wire W131 (or W133). Therefore, the impedance of the transmission wire W131 (or W133) is less than the impedance of the transmission wire W132. Since the impedance of the transmission wire W132 that the start pulse signal STV22 is transmitted through is relatively larger, the driving ability of the second scan driving signal output by the first-stage shift register of the scan driving circuit 224 has a chance to match the driving ability of the first scan driving signal output by the last-stage shift register of the scan driving circuit 223. As a result, the rising time Tr (or falling time Tf) of the second scan driving signal output by the scan driving circuit 224 can be approximately the same as the rising time Tr (or falling time Tf) of the first scan driving signal output by the scan driving circuit 223, thereby reducing the horizontal stripe phenomenon.

Although the present disclosure has been described with reference to the embodiments above, the embodiments are not intended to limit the present disclosure. Any person skilled in the art can make some changes and modifications without departing from the spirit and scope of the disclosure. Therefore, the scope of the present disclosure will be defined in the appended claims.

What is claimed is:

1. A driving integrated circuit for driving a display panel, the driving integrated circuit comprising:

a first output buffer, configured to generate a first start pulse signal to a first scan driving circuit of the display panel, wherein the first scan driving circuit sequentially generates a first plurality of scan driving signals based on the first start pulse signal, and the first plurality of scan driving signals are output to a plurality of first scan lines of the display panel; and a second output buffer, configured to generate a second start pulse signal to a second scan driving circuit of the display panel, wherein the second scan driving circuit sequentially generates a second plurality of scan driving signals based on the second start pulse signal, and the second plurality of scan driving signals are output to a plurality of second scan lines of the display panel, wherein the earliest second scan line of the plurality of second scan lines is driven after the plurality of first scan lines are driven; and wherein the second output buffer comprises a plurality of driving units which are respectively controlled to generate the second start pulse signal having a driving ability less than a driving ability of the first start pulse signal, wherein each of the driving units of the second output buffer comprises a pull-up transistor coupled to a first voltage and a pull-down transistor coupled to a second voltage, wherein the first voltages in different driving units are different from each other, and the second voltages in different driving units are different from each other.

2. The driving integrated circuit according to claim 1, further comprising:

a control circuit, coupled to the first output buffer and the second output buffer, and configured to output a plurality of control signals to respectively turn on or turn off the plurality of driving units of the second output buffer.

3. The driving integrated circuit according to claim 1, wherein the pull-up transistor comprises a first terminal coupled to the first voltage, a second terminal coupled to an output terminal of the second output buffer, and a control terminal controlled by a first control signal provided by a control circuit coupled to the second output buffer; and the pull-down transistor comprises a first terminal coupled to the second voltage, a second terminal coupled to the output terminal of the second output buffer, and a control terminal controlled by a second control signal provided by the control circuit.

4. The driving integrated circuit according to claim 3, wherein a number of the driving units which are active for generating the second start pulse signal among the second output buffer is less than a number of the driving units which are active for generating the first start pulse signal among the first output buffer.

5. The driving integrated circuit according to claim 3, wherein the second start pulse signal goes through at least one middle voltage during transiting from a high voltage to a low voltage and from the low voltage to the high voltage, and wherein the high voltage, the low voltage and the at least one middle voltage are selected from the first voltages and the second voltages, and the at least one middle voltage is between the high voltage and the low voltage.

6. The driving integrated circuit according to claim 3, wherein at least one of a lowest voltage of the second start pulse signal and a highest voltage of the second start pulse signal is configured to be different from a lowest voltage of the first start pulse signal and a highest voltage of the first start pulse signal.

7. A driving integrated circuit for driving a display panel, the driving integrated circuit comprising:

a first output buffer, comprising at least one driving unit for generating a first start pulse signal to a first scan driving circuit of the display panel, wherein the first scan driving circuit sequentially generates a first plurality of scan driving signals based on the first start pulse signal, and the first plurality of scan driving signals are output to a plurality of first scan lines of the display panel;

a second output buffer, comprising at least one driving unit for generating a second start pulse signal to a second scan driving circuit of the display panel, wherein the second scan driving circuit sequentially generates a second plurality of scan driving signals based on the second start pulse signal, and the second plurality of scan driving signals are output to a plurality of second scan lines of the display panel, wherein the earliest second scan line of the plurality of second scan lines is driven after the plurality of first scan lines are driven; and a control circuit, coupled to the first output buffer and the second output buffer, and configured to output a plurality of control signals to the first output buffer and the second output buffer, wherein the control circuit controls at least one of the first output buffer and the second output buffer to generate the second start pulse having a duty cycle less than a duty cycle of the first start pulse signal, wherein each of the driving units of the first output buffer and the second output buffer comprises a pull-up transistor coupled to a first voltage and a pull-down transistor coupled to a second voltage, wherein the first voltages in different driving units are different from each other, and the second voltages in different driving units are different from each other.

8. The driving integrated circuit according to claim 7, wherein the pull-up transistor comprises a first terminal coupled to the first voltage, a second terminal coupled to an output terminal of the second output buffer, and a control terminal controlled by a first control signal among the plurality of control signals; and the pull-down transistor comprises a first terminal coupled to the second voltage, a second terminal coupled to the output terminal of the second output buffer, and a control terminal controlled by a second control signal among the plurality of control signals, wherein the duty cycle of each of the first start pulse signal and the second start pulse signal is determined based on the first control signals and the second control signals respectively controlling the first output buffer and the second output buffer.

* * * * *